(12) United States Patent
Sung et al.

(10) Patent No.: US 12,194,404 B2
(45) Date of Patent: Jan. 14, 2025

(54) COOLING AND SMOG FILTERING BUILDING FACADE PANEL

(71) Applicant: UNIVERSITY OF SOUTHERN CALIFORNIA, Los Angeles, CA (US)

(72) Inventors: Doris Sung, Los Angeles, CA (US); Mitul Luhar, Los Angeles, CA (US); Ivan Bermejo-Moreno, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 251 days.

(21) Appl. No.: 17/797,995

(22) PCT Filed: Feb. 5, 2021

(86) PCT No.: PCT/US2021/016805
§ 371 (c)(1),
(2) Date: Aug. 5, 2022

(87) PCT Pub. No.: WO2021/158909
PCT Pub. Date: Aug. 12, 2021

(65) Prior Publication Data
US 2023/0085424 A1 Mar. 16, 2023

Related U.S. Application Data

(60) Provisional application No. 62/970,288, filed on Feb. 5, 2020.

(51) Int. Cl.
*B01D 39/00* (2006.01)
*B01D 46/10* (2006.01)
(Continued)

(52) U.S. Cl.
CPC ......... *B01D 46/2403* (2013.01); *B01D 46/10* (2013.01); *B01D 53/007* (2013.01); *B01D 53/86* (2013.01); *E04F 13/08* (2013.01)

(58) Field of Classification Search
CPC ............ B01D 2258/06; B01D 2251/11; B01D 46/10; Y02E 20/32; E04B 1/00
(Continued)

(56) References Cited

U.S. PATENT DOCUMENTS

2007/0033891 A1* 2/2007 Imbabi ................... B01D 39/00
52/387
2011/0016806 A1 1/2011 Imbabi et al.
(Continued)

FOREIGN PATENT DOCUMENTS

JP 2002061314 A 2/2002
KR 20100027261 A 3/2010
(Continued)

OTHER PUBLICATIONS

International Search Report dated May 24, 2021 for PCT Appn. No. PCT/US2021/016805, 3 pgs.

*Primary Examiner* — Long T Tran
*Assistant Examiner* — James J Kim
(74) *Attorney, Agent, or Firm* — Brooks Kushman P.C.

(57) ABSTRACT

A filtering device for incorporation into an architectural façade panel includes a tubular channel having an inlet section, an outlet section, and a constricted section interposed between and in fluid communication with the inlet section and outlet section. A filtering component is attached to the tubular channel or integrated into a material forming the tubular channel. The filtering device also includes an attachment component for attachment of the filtering device to an architectural structure. The attachment component is adapted to orient the tubular channel with the inlet section positioned to face predetermined prevailing winds when the filtering device is attached to the architectural structure.

27 Claims, 10 Drawing Sheets

(51) Int. Cl.
  *B01D 46/24*   (2006.01)
  *B01D 53/00*   (2006.01)
  *B01D 53/86*   (2006.01)
  *E04F 13/08*   (2006.01)

(58) Field of Classification Search
  USPC .......................................................... 55/498
  See application file for complete search history.

(56) References Cited

U.S. PATENT DOCUMENTS

| | | | | |
|---|---|---|---|---|
| 2016/0129434 | A1* | 5/2016 | Pokoo-Aikins | E06B 9/06 |
| | | | | 502/2 |
| 2023/0354755 | A1* | 11/2023 | Naidu | A01G 9/025 |
| 2023/0405494 | A1* | 12/2023 | Bower | C01F 11/181 |
| 2024/0116012 | A1* | 4/2024 | Kim | B01D 53/38 |

FOREIGN PATENT DOCUMENTS

| | | |
|---|---|---|
| WO | 2010/122353 A1 | 10/2010 |
| WO | 2015/102486 A2 | 7/2015 |

* cited by examiner

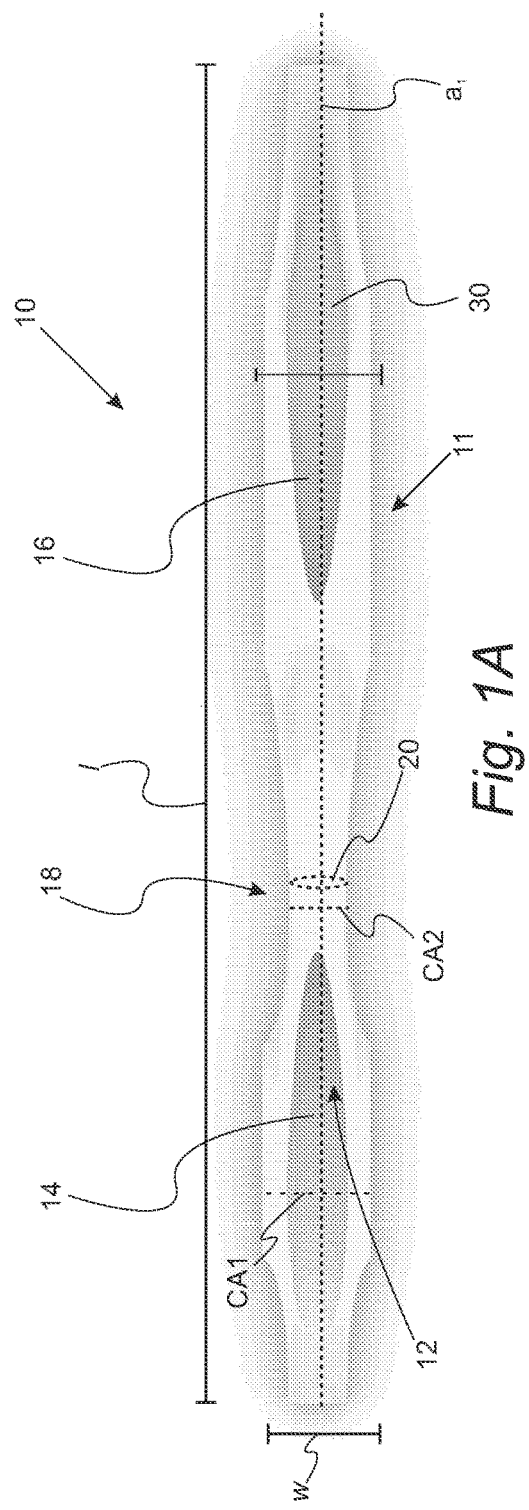
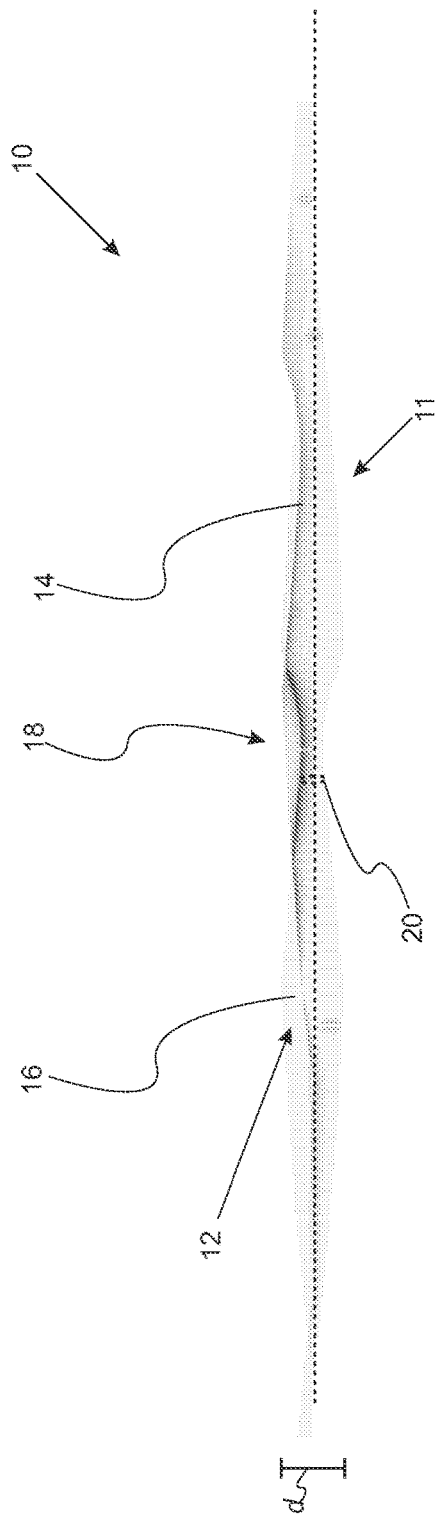
Fig. 1A
Fig. 1B

COOLING AND SMOG FILTERING BUILDING FACADE PANEL

CROSS-REFERENCE TO RELATED APPLICATIONS

This application is the U.S. national phase of PCT Appln. No. PCT/US2021/016805 filed Feb. 5, 2021, which claims the benefit of U.S. provisional application Ser. No. 62/970,288 filed Feb. 5, 2020, the disclosures of which are hereby incorporated in their entirety by reference herein.

TECHNICAL FIELD

In at least one aspect, the present invention is related to architectural components for filtering the environment around a building or other architectural structures.

BACKGROUND

Despite public policies requiring more efficient automobile engines and cleaner fuels, outdoor air pollution is on the rise in cities worldwide. A high incidence of air pollutant-caused heart and lung diseases is found in the urban poor who live in congested and stressed socio-economic conditions. Mitigating pollution to address public health impacts has increasingly become a crisis that even architects must be called upon to address.

Accordingly, there is a need for architectural structures that can assist in mitigating air pollution.

SUMMARY

In at least one aspect, a filtering device for incorporation into an architectural façade panel is provided. The filtering device includes at least one tubular channel having an inlet section, an outlet section, and a constricted section interposed between the inlet section and the outlet section. One or more solid structures define the tubular channel. The constricted section is in fluid communication with the inlet section and outlet section. At least one filtering component is attached to the tubular channel or integrated into a material forming the tubular channel. The filtering device also includes an attachment component(s) for attachment of the filtering device to an architectural structure. The attachment component is adapted to orient the tubular structure with the inlet section positioned facing predetermined prevailing winds when the filtering device is attached to the architectural structure. Advantageously, the filtering device utilizes passive methods of wind movement to filter particulate matter from urban environments on building surfaces.

In another aspect, a panel of filtering devices that includes a plurality of the filtering devices set forth herein is provided. Each filtering device includes at least one tubular channel defined by one or more structures and having an inlet section, an outlet section, and a constricted section interposed between the inlet section and the outlet section. The constricted section is fluid communication with the inlet section and outlet section. Each filtering device includes at least one filtering component attached to the tubular channel or integrated into a material forming the tubular channel and an attachment component(s) for attaching the panel of filtering devices to an architectural structure. Characteristically, the attachment component is adapted to orient the tubular channel with the inlet section positioned facing predetermined prevailing winds when the panel of filtering devices is attached to the architectural structure.

In another aspect, a facade panel that can control airflow and filtration at a micro-level is provided.

In another aspect, variations seek to utilize the immense amount of square footage on the urban side of a building's envelope as a new type of infrastructure for supporting public works and mitigating public health problems.

In still another aspect, the filtering device and panels described herein allow a building facade to filter smog and provide fresher air to outdoor pedestrians.

In another aspect, an architectural panel that can modulate airflow and filter air pollution is provided. Advantageously, the panel can passively perform so that it can be applied anywhere at low cost and with minimal or no maintenance.

In another aspect, architectural panels provide passive multifunctional facades for structures that can modify the prevailing winds well as any vehicle-induced flows to provide services such as heating, ventilation, filtering, and cooling for pedestrians.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIG. 1A. Top view of a filtering device.

FIG. 1B. Side view of a filtering device.

FIGS. 2A and 2B. Top and side views of a tubular channel with a tapering inlet section and an expanding outlet section.

DETAILED DESCRIPTION

Figure 1C:
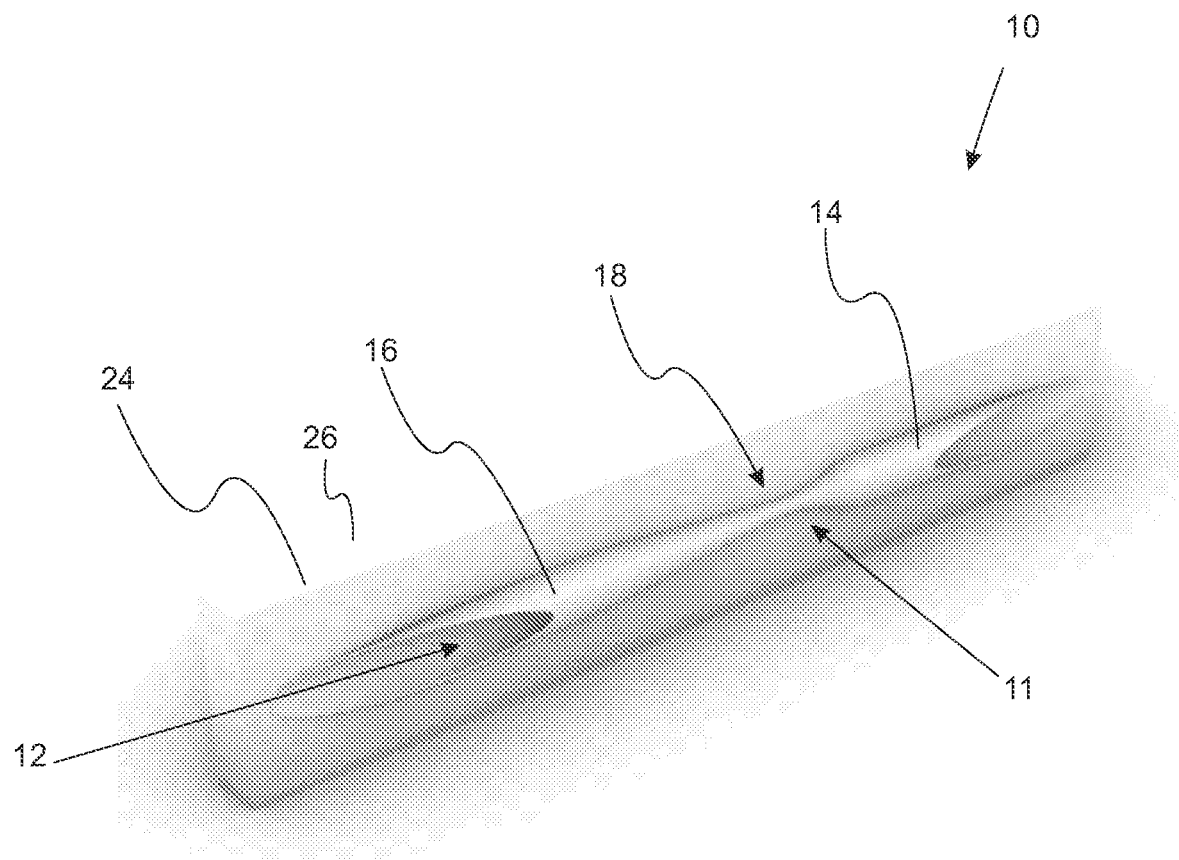
FIG. 1C. Perspective view of a filtering device attached to a carrier block.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The phrase "composed of" means "including" or "consisting of" Typically, this phrase is used to denote that an object is formed from a material.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The letter "s" in parenthesis (i.e., (s)) following the name of component means at least one of the component or one or more of the component. For example, "wing(s)" means at least one wing or one or more wings.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

For any device described herein, linear dimensions and angles can be constructed with plus or minus 50 percent of the values indicated rounded to or truncated to two significant figures of the value provided in the examples. In a refinement, linear dimensions and angles can be constructed with plus or minus 30 percent of the values indicated rounded to or truncated to two significant figures of the value provided in the examples. In another refinement, linear dimensions and angles can be constructed with plus or minus 10 percent of the values indicated rounded to or truncated to two significant figures of the value provided in the examples.

The "micron-sized" means a structure that has at least one dimension from 50 to 5000 microns. In a refinement, micron-sized structures have at least one dimension from 50 to 1000 microns. In a refinement, micron-sized structures have at least one dimension from 100 to 500 microns.

Throughout this application, where publications are referenced, the disclosures of these publications in their entireties are hereby incorporated by reference into this application to more fully describe the state of the art to which this invention pertains.

With reference to FIGS. 1A, 1B, and 1C, schematic illustrations of a filtering device for incorporation into an architectural façade panel are provided. Filtering device 10 includes one or more structures 11 that defines a tubular channel 12 having inlet section 14, outlet section 16, and constricted section 18. For example, the one or more structures 11 can be a tubular structure (e.g., a tube optionally with a positionally varying cross-section). In another example, a curved structure is combined with another structure that is a flat or curved solid structure to form/define the tubular channel. Constricted section 18 is interposed between and in fluid communication with inlet section 14 and outlet section 16. In a refinement, inlet section 14 and outlet section 16 each independently define an oblique opening (i.e., an angled opening). In another refinement, inlet section 14, outlet section 16, and constricted section 18 are aligned (e.g., centered on) along axis $a_c$, which can be straight or curved. Filtering component 20 is attached to the tubular channel 12 or integrated into a material, forming (i.e., defining) the tubular channel. Filtering component 20 can apply physical (e.g., removal of smog particulate matter) and/or chemical filtering (e.g., photocatalysts). In a refinement, filtering device 10 also includes attachment component 24 for attachment of the filtering device to an architectural structure (e.g., a building). In a refinement, attachment component 24 is adapted to orient the tubular structure with the inlet section positioned facing predetermined prevailing winds when the filtering device is attached to the architectural structure. Attachment component 24 can be any surface (referred to as an "attachment surface") that is mountable on an architectural structure. Therefore, the attachment component can be a surface of the material forming the tubular channel. In the example depicted in FIG. 1C, attachment component 24 is a block that allows attachment to an architectural structure with back surface 26 placed over the architectural structure. Advantageously, filtering device 12 utilizes passive methods of wind movement to filter particulate matter from urban environments. Relevant methods of air movement in can include Venturi Effect, Bernoulli's Principle of pressure, wind tower effect, wind scoop, solar chimney (e.g., the stack effect), and the like. It should also be appreciated that filtering device 10 can include multiple tubular channels 12, filtering components 20, and multiple attachment components 24.

Although the present embodiment is not limited by the dimensions of filtering device 10, typically, the tubular channel can have a length l from about 3 inches to about 25 feet or more, a width w of about ⅛ inch to about a 25 inches or more, and a height d from about ⅛ inch to about 25 inches or more as depicted in FIGS. 1A and 1B. In this regard, the length l, the width w, and the height d are the maximum spatial extent in three orthogonal directions.

In a variation, tubular channel 12 has a length l from about 3 inches to about 10 feet, a width w of about ⅛ inch to about 6 inches or more, and a height d from about ⅛ inch to about 6 inches. In another refinement, the tubular channel has a length l from about 3 inches to about 6 feet, a width w of about ⅛ inch to about 6 inches or more, and a height d from about ⅛ inch to about 6 inches. It should be appreciated that the width and height can vary along the length 1 since the filtering devices has a specially designed shape to accomplish the benefits of the present embodiment. In another variation, tubular channel 12 can be a micron-sized channel and a micron-sized width w and/or height d. In a variation, the micron-sized channel has a width w from 50 to 5000 microns and a height d from 50 to 5000 microns. In a refinement, the micron-sized channel has a width w from 50 to 1000 microns and a height d from 50 to 1000 microns. In another refinement, the micron-sized channel has a width w from 100 to 500 microns and a height d from 100 to 500 microns. In another refinement, the length can be from about 1 inch to about 25 feet or more. In still another refinement, the length can be from about 6 inches to about 10 feet. In yet another refinement, the length can be from about 3 inches to about 6 feet. Tubular channel 12 can be formed from any number of architectural materials. For example, tubular channel 12 can be composed of a structural material selected from the group consisting of ceramic, plastic and plastic composites, clay, concrete, cement composites, and combinations thereof.

Still referring to FIGS. 1A, 1B, and 1C, the tubular channel has a first cross-section CA1 having a maximum cross-sectional area and a second cross-section CA2 having a minimum cross-sectional area. Typically, the second cross-section occurs in constricted section 18. Typically, the ratio of the maximum cross-sectional area to the minimum cross-sectional area is from 5:1 to 50:1. In a refinement, the ratio of the maximum cross-sectional area to the minimum cross-sectional area is at least in increasing order of preference, 2:1, 3:1, 5:1, 10:1, 20:1, or 30:1. In a further refinement, the ratio of the maximum cross-sectional area to the minimum cross-sectional area is at most in increasing order of preference, 100:1, 75:1, 60:1, 50:1, 40:1, or 35:1.

As set forth above, filtering device 10 can include a filtering component. In one refinement, filtering component 20 is an insert positioned within the constricted section 18. In another refinement, filtering component 20 is a coating disposed over at least a portion of an inner wall and or an outer wall of the tubular channel. In still another refinement, tubular channel 12 is composed of a structural material infused with the filtering component. Examples of chemically active materials for the filtering component include but are not limited to photocatalytic titanium oxide, activated carbon, aluminum turnings or powder, magnesium turnings or powder, and combinations thereof. The photocatalytic titanium oxide can be rutile or anatase with rutile being preferred. Alternatively, an internal surface and/or an external surface of one or more structures 11 that defines a tubular channel 12 can be coated with the chemically active materials.

In a variation, filtering device 10 includes a light or heat-absorbing material 30 proximate to the inlet section to induce a stack effect for driving air through the tubular channel. In a refinement, such light or heat-absorbing material will have a dark color (e.g., black). In a further refinement, the heat-absorbing material can be composed of a metal (e.g., aluminum, stainless steel, copper, iron, iron alloys, and the like. Additional examples of heat-absorbing materials include concrete, tiles, brick, rammed earth. and stone.

Figure 2C:
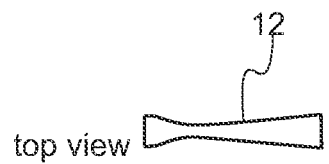
FIG. 2C. Top and side views of a tubular channel completely embedded in a block.
Figure 2C:
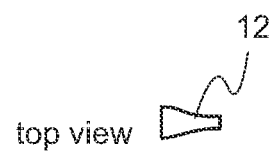
Figure 2C:
Figure 2C:
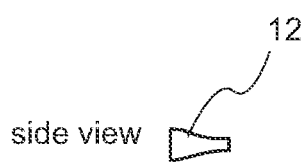
Figure 2C:
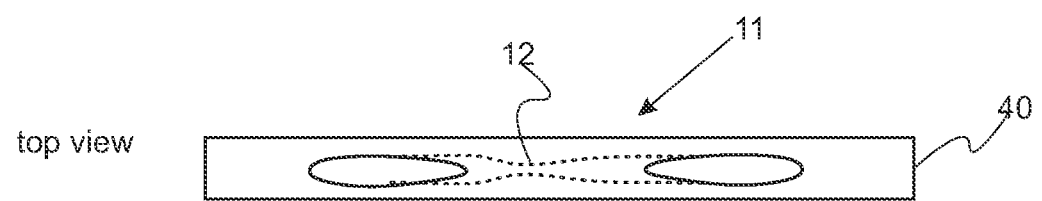
Figure 2C:
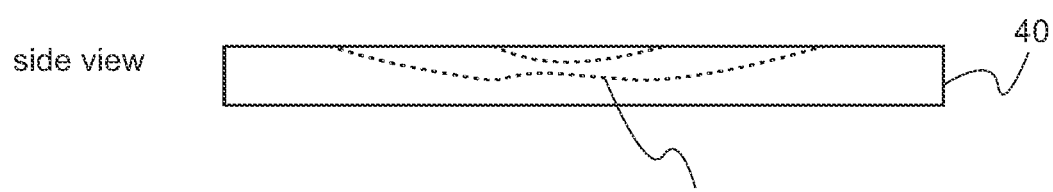
Figure 2D:
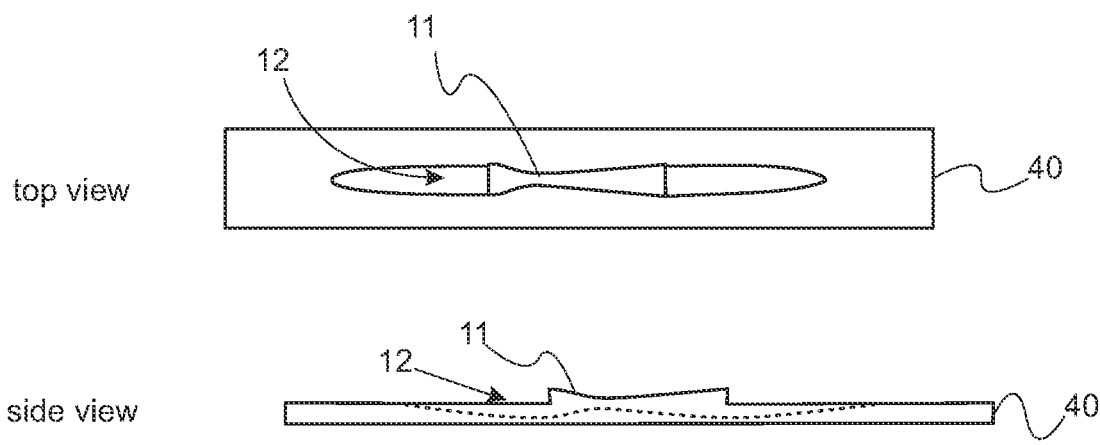
FIG. 2D. Top and side views of a tubular channel partially embedded in a block.
Figure 2E:
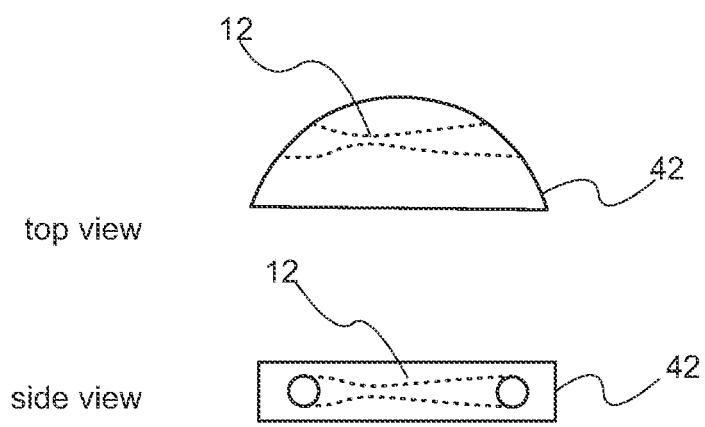
FIG. 2E. Top and side views of a tubular channel completely embedded in semi-disk object 42.

FIGS. 2A-2E depict various structures incorporating tubular channel 12. In a variation, tubular channel 12 tapers from the inlet section to a predetermined position within the constricted section having a minimum cross-sectional area. In a further refinement, the tubular channel expands from the predetermined position to the outlet section. FIGS. 2A and 2B provide a top view of the tubular channel with a tapering inlet section and an expanding outlet section. FIGS. 2C, 2D, and 2E illustrate variations in which tubular channel 12 is embedding in an object having a predetermined shape. Advantageously, the shape of the object, or outer surface of the panel, can be determined by airflow studies on the outer surface. In FIG. 2C, tubular channel 12 is completely embedded in (and defined by) block 40. In FIG. 2D, tubular channel 12 is partially embedded in (and defined by) block 40. In FIG. 2C, tubular channel 12 is completely embedded in semi-disk object 42.

Figure 3A:
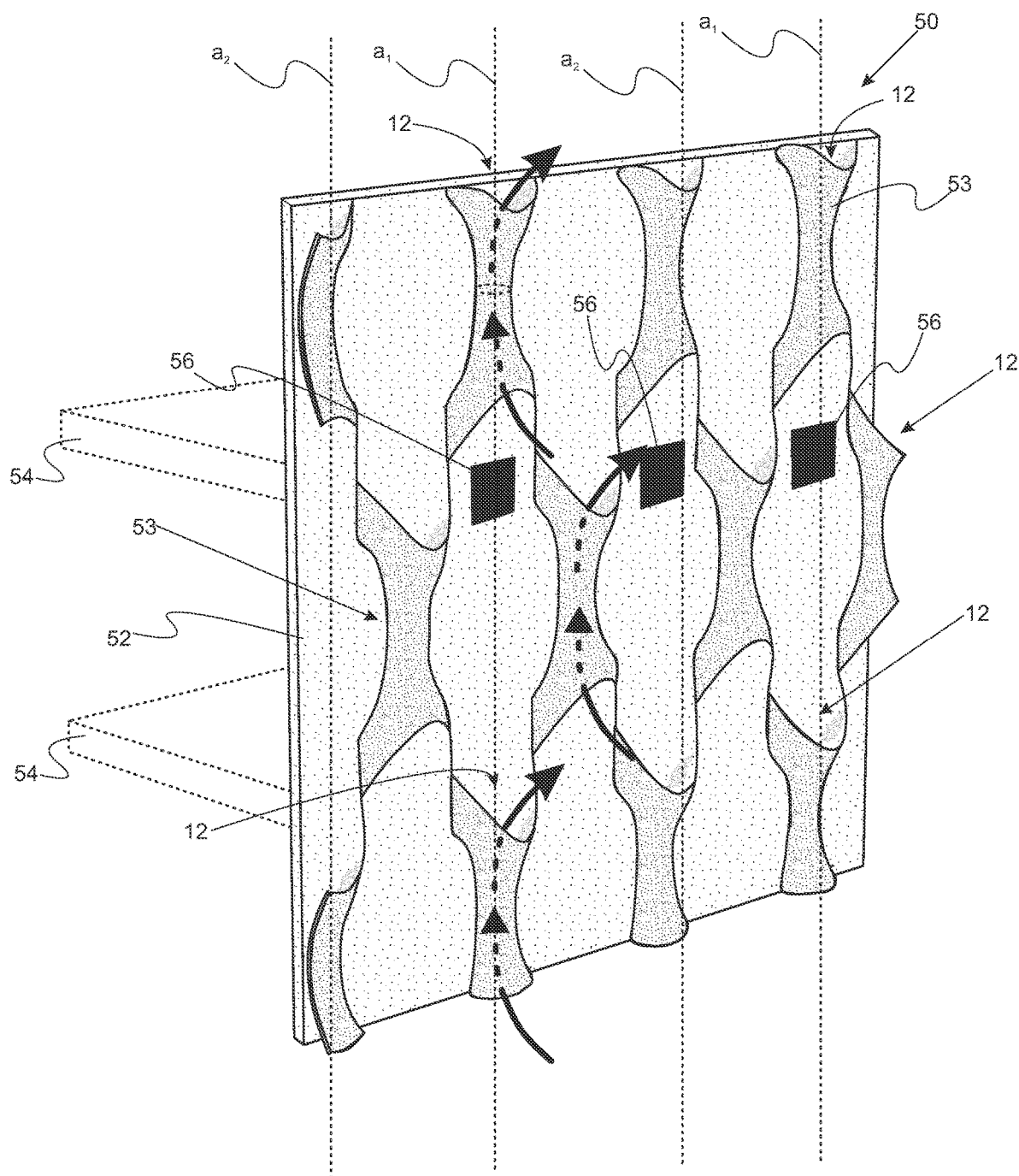
FIG. 3A. Perspective view of a panel having a plurality of filtering devices.
Figure 3B:
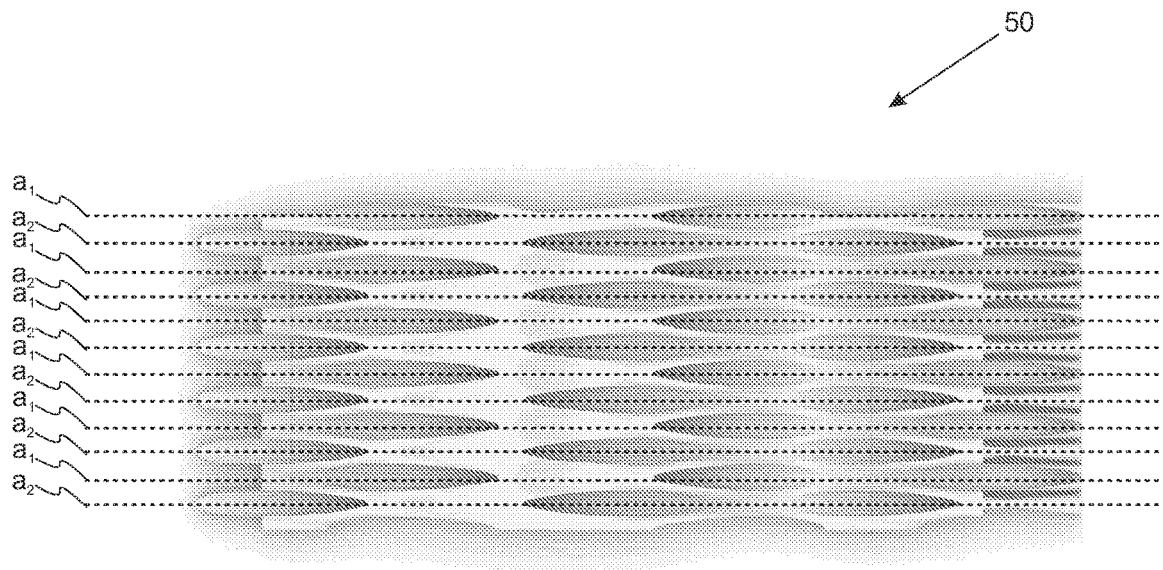
FIG. 3B. Top view of a panel having a plurality of filtering devices.
Figure 3C:
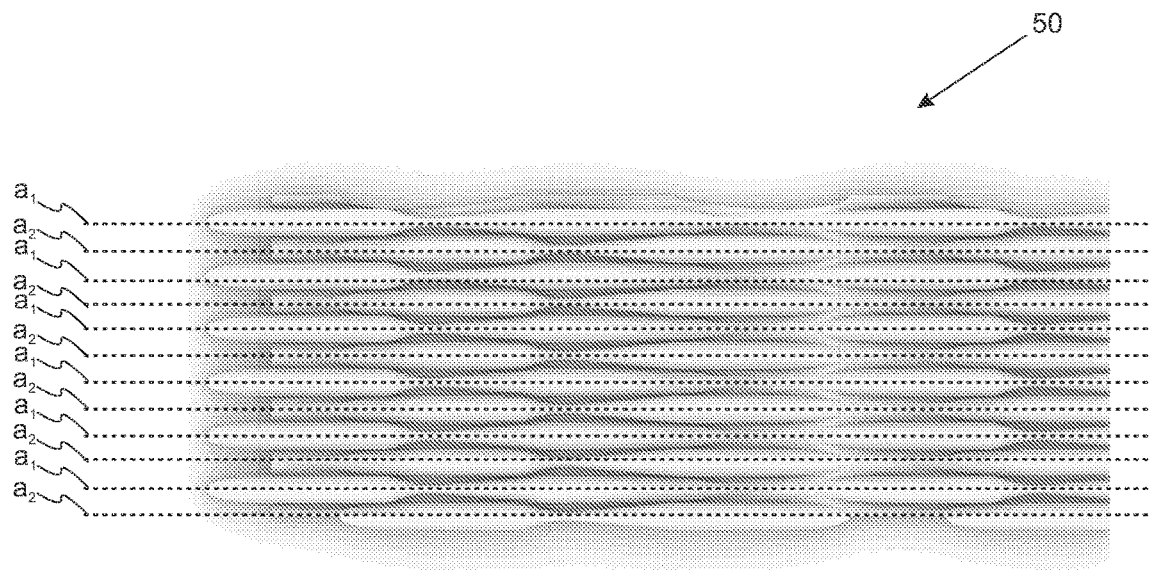
FIG. 3C. Bottom view of a panel having a plurality of filtering devices.

With reference to FIGS. 3A, 3B, and 3C, schematic illustrations for a panel of filtering devices for incorporation into an architectural façade panel are provided. Filtering panel 50 includes a plurality of filtering devices 10 having the structure and features of the filtering devices depicted in FIGS. 1A-1C and 2A-2E. Typically, the panel includes a substrate 52 to which the plurality of filtering devices 10 is attached or formed therein. For example, each tubular channel is defined by a curved structure 53 and a face of substrate 52. The substrate 52 can include attachment features 54 to facilitate inclusion in an architectural structure. FIG. 3A shows rectangular blocks that function at the attachment features. Collectively, substrate 52 and attachment features 54 forms the attachment component set forth above. In a refinement, a first subset of the panel of filtering devices are arranged into a first set of rows of filtering devices with inlet sections, outlet section, and constricted section aligned about a first axis $a_1$. In a further refinement, a second subset of the panel of filtering devices 12 is arranged into a second set of rows of filtering devices with inlet sections, outlet sections, and constricted sections aligned about a second axis $a_2$. Typically, each row of the second subset is offset from an adjacent row of the first subset. In a variation, a plurality of light or heat-absorbing sections 56 are dispersed among the panel of filtering devices. It should be appreciated that filtering panel 50 can include additional sets of rows of filtering devices with inlet sections, outlet section, and constricted section aligned about additional axes an.

Figure 4A:
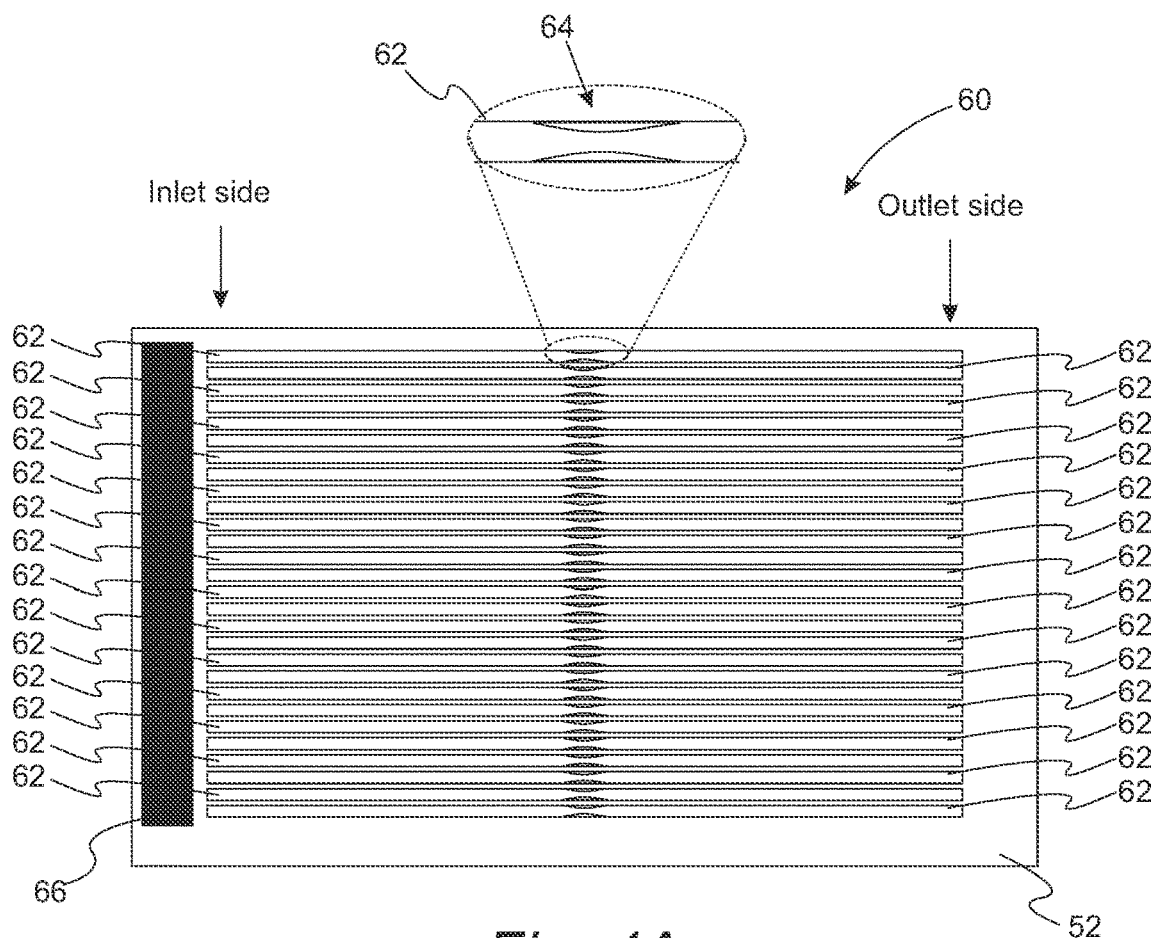
FIG. 4A. Top view of a panel having a plurality of micron-sized tubes.
Figure 4B:
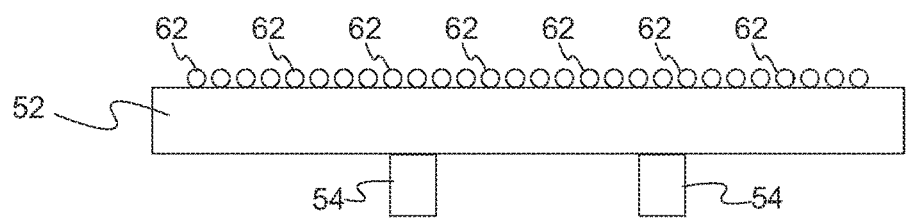
FIG. 4B. Side view of a panel having a plurality of micron-sized tubes.
Figure 4C:
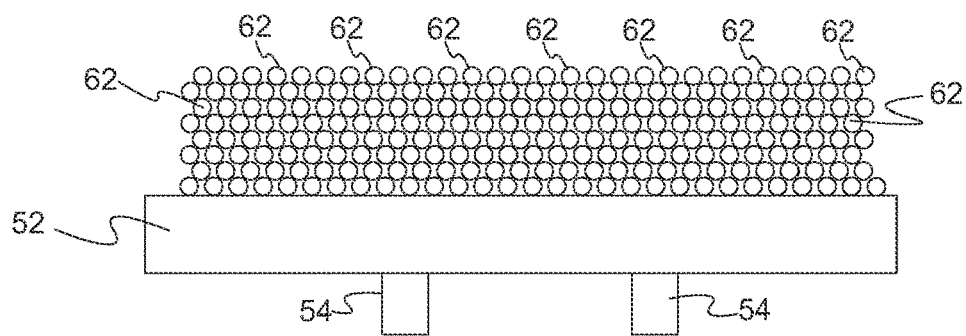
FIG. 4C. Side view of a panel having a plurality of stacked micron-sized tubes.

With reference to FIGS. 4A, 4B, and 4C, schematic illustrations for a panel of micron-sized filtering devices for incorporation into an architectural façade panel are provided. Filtering panel 60 includes a plurality of micron-sized filtering devices 62. Typically, the micron-sized filtering devices are micron-sized tubes. As set forth above, the micron-sized filtering devices can each include an inlet section, an outlet section, and a constricted section interposed between and in fluid communication with the inlet section and outlet section. In some variations, filtering devices 62 having the structure and features of the filtering devices depicted in FIGS. 1A-1C and 2A-2E. In a refinement, the micron-sized filtering devices include (or defines) a flow constricted section 64. FIGS. 4A and 4B depict a variation in which the plurality of filtering devices 62 are arranged as a single layer over substrate 52 with attachment features 54 as set forth above. FIG. 4C depicts a variation in which plurality of micron-sized filtering devices 62 is arranged as a stack over substrate 52. As set forth above, the ratio of the maximum cross-sectional area to the minimum cross-sectional area is from 5:1 to 50:1. In a refinement, the ratio of the maximum cross-sectional area to the minimum cross-sectional area is at least in increasing order of preference, 2:1, 3:1, 5:1, 10:1, 20:1, or 30:1. In a further refinement, the ratio of the maximum cross-sectional area to the minimum cross-sectional area is at most in increasing order of preference, 100:1, 75:1, 60:1, 50:1, 40:1, or 35:1.

In a variation, filtering panel 60 includes a plurality of light or heat-absorbing sections 66 as set forth above. In some refinements, an internal surface and/or an external surface of the microtubes are coated with the chemically active materials. Examples of chemically active materials for the filtering component include but are not limited to, photocatalytic titanium oxide, activated carbon, aluminum turnings or powder, magnesium turnings or powder, and combinations thereof. The photocatalytic titanium oxide can be rutile or anatase with rutile being preferred. The micron-sized tubes can be embedded in a solid matrix such as ceramic, plastic and plastic composites, clay, concrete, cement composites, polymers, and combinations thereof.

The following examples illustrate the various embodiments of the present invention. Those skilled in the art will recognize many variations that are within the spirit of the present invention and scope of the claims.

Figure 5:
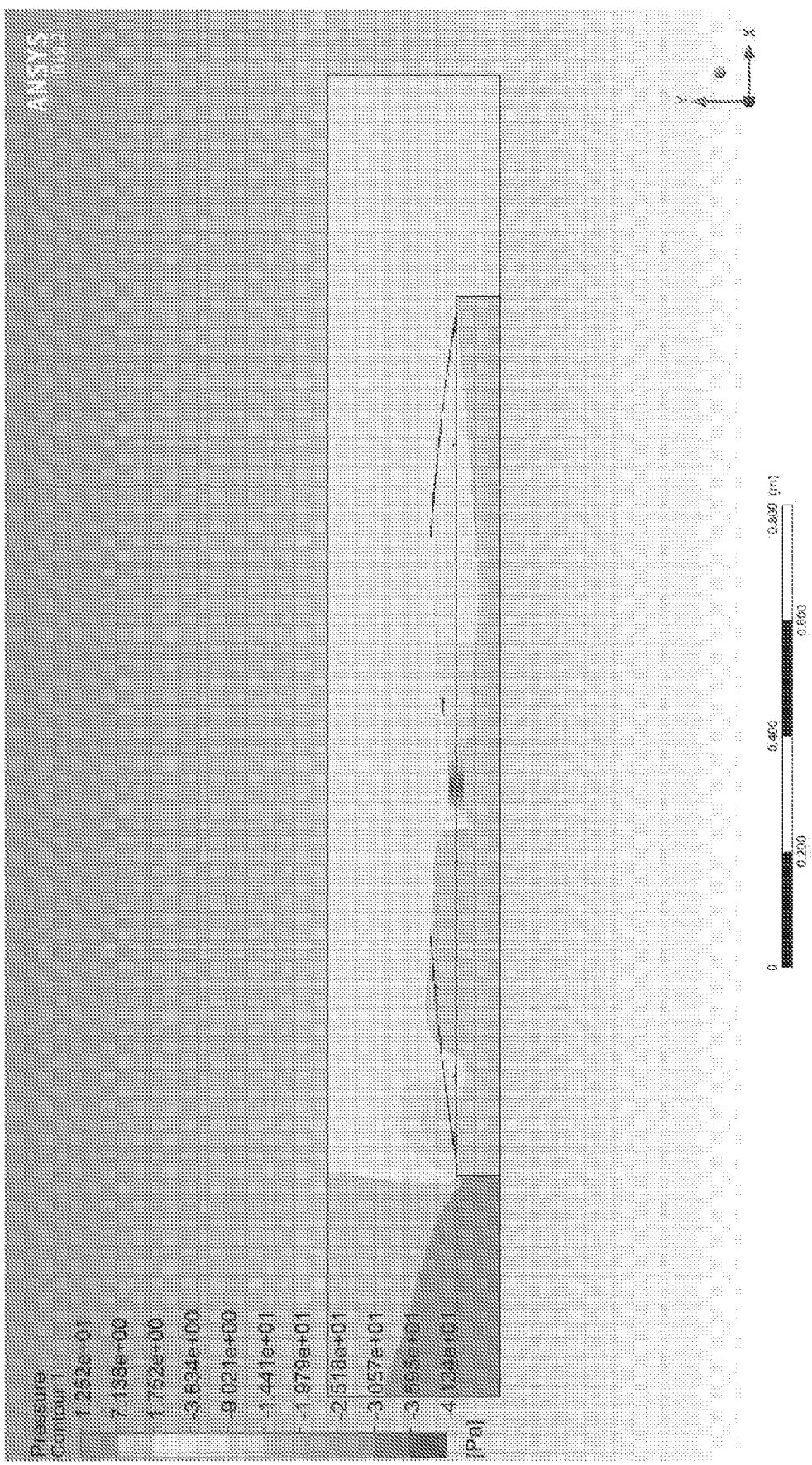
FIG. 5. Stimulated pressure profile for a tubular channel as described above
Figure 6:
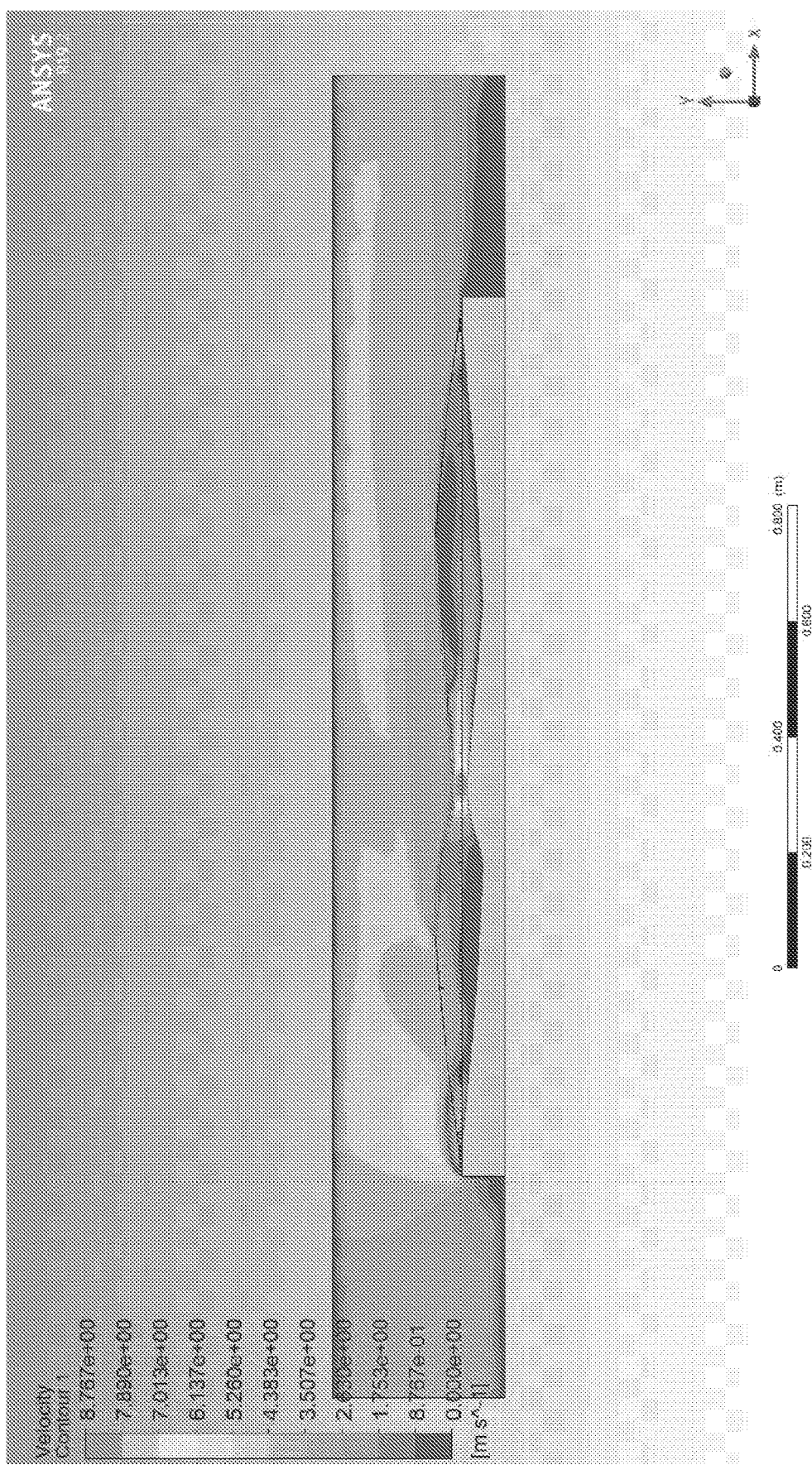
FIG. 6. Simulated velocity profile for a tubular channel as described above.
Figure 7:
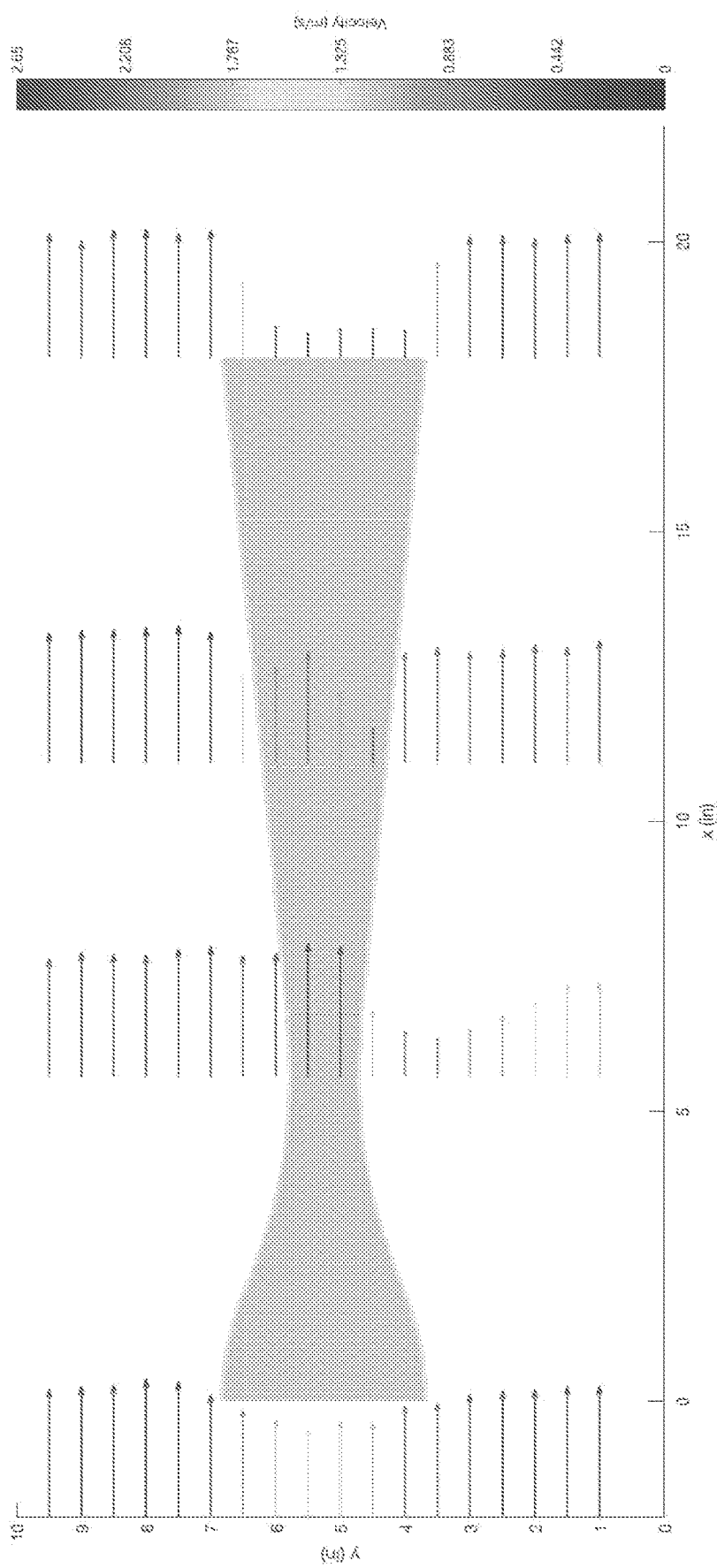
FIG. 7. The experimentally measured velocity profile in a laboratory-scale wind tunnel.

FIG. 5 provides a simulated pressure profile for a tubular channel as described above. It can be seen that the lowest pressures are in the vicinity of the constricted region. FIG. 5 provides a simulated velocity profile for a tubular channel as described above. It can be seen that the highest velocities are in the vicinity of the constricted region. FIG. 6 provides an experimentally measured velocity profile in a laboratory-scale wind tunnel. In these experiments, the highest velocity was in the vicinity of the constricted region.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A filtering device for incorporation into an architectural façade panel, the filtering device comprising:
   at least one tubular channel having an inlet section, an outlet section, and a constricted section interposed between and in fluid communication with the inlet section and outlet section;
   at least one filtering component attached to the tubular channel or integrated into a material forming the tubular channel; and
   an attachment component(s) for attaching the filtering device to an architectural structure, the attachment component adapted to orient the tubular channel with the inlet section positioned facing predetermined prevailing winds when the filtering device is attached to the architectural structure.

2. The filtering device of claim 1 wherein the tubular channel tapers from the inlet section to a predetermined position within the constricted section having a minimum cross-sectional area.

3. The filtering device of claim 2 wherein the tubular channel expands from the predetermined position to the outlet section.

4. The filtering device of claim 1 wherein the tubular channel is composed of a structural material selected from the group consisting of ceramic, plastic and plastic composites, clay, concrete, cement composites, and combinations thereof.

5. The filtering device of claim 1 wherein the filtering component is an insert positioned within the constricted section.

6. The filtering device of claim 1 wherein the filtering component is a coating disposed over at least a portion of an inner wall of the tubular channel.

7. The filtering device of claim 1 wherein the tubular channel is composed of a structural material infused with the filtering component.

8. The filtering device of claim 1 wherein the filtering component applies physical or chemical filtering.

9. The filtering device of claim 1 wherein the filtering component comprises a component selected from the group consisting of photocatalytic titanium oxide, activated carbon, aluminum turnings or powder, magnesium turnings or powder, and combinations thereof.

10. The filtering device of claim 1 wherein the attachment component includes an attachment surface that is mountable on the architectural structure.

11. The filtering device of claim 1 further comprising a light or heat-absorbing material proximate to the inlet section to induce a stack effect for driving air through the tubular channel.

12. The filtering device of claim 1 wherein the inlet section and outlet section each independently define an oblique opening.

13. The filtering device of claim 1 wherein the tubular channel is embedded in an object having a predetermined shape.

14. The filtering device of claim 13 wherein the predetermined shape is a block.

15. The filtering device of claim 13 wherein the predetermined shape is a semi-disk.

16. The filtering device of claim 1 wherein the at least one tubular channel is micron-sized.

17. A panel of filtering devices comprising a plurality of filtering devices, each filtering device including:
   at least one tubular channel having an inlet section, an outlet section, and a constricted section interposed between and in fluid communication with the inlet section and outlet section;
   at least one filtering component attached to the tubular channel or integrated into a material forming the tubular channel; and
   an attachment component(s) for attaching the panel of filtering devices to an architectural structure, the attachment component adapted to orient the tubular channel with the inlet section positioned facing predetermined prevailing winds when the panel of filtering devices is attached to the architectural structure.

18. The panel of filtering devices of claim 17 wherein the tubular channel tapers from the inlet section to a predetermined position within the constricted section having a minimum cross-sectional area.

19. The panel of filtering devices of claim 18 wherein the tubular channel expands from the predetermined position to the outlet section.

20. The panel of filtering devices of claim 17 wherein the tubular channel is composed of a structural material selected from the group consisting of ceramic, plastic and plastic composites, clay, concrete, cement composites, and combinations thereof.

21. The panel of filtering devices of claim 17 wherein the filtering component is an insert positioned within the constricted section.

22. The panel of filtering devices of claim 17 wherein the filtering component is a coating disposed over at least a portion of an inner wall of the tubular channel.

23. The panel of filtering devices of claim 17 wherein a first subset of the panel of filtering devices are arranged into a first set of rows of filtering devices with inlet sections, outlet section, and constricted section aligned about a first axis.

24. The panel of filtering devices of claim 23 wherein a second subset of the panel of filtering devices are arranged into a second set of rows of filtering devices with inlet sections, outlet sections, and constricted sections aligned about a second axis.

25. The panel of filtering devices of claim 24 wherein each row of the second subset is offset from an adjacent row of the first subset.

26. The panel of filtering devices of claim 17 wherein a plurality of light or heat-absorbing sections is dispersed among the panel of filtering devices.

27. The panel of filtering devices of claim 17 wherein the at least one tubular channel is micron-sized.

\* \* \* \* \*